United States Patent
Lu et al.

(10) Patent No.: US 10,382,744 B2
(45) Date of Patent: Aug. 13, 2019

(54) MONITOR SYSTEM AND OPERATION METHOD THEREOF

(71) Applicant: Etron Technology, Inc., Hsinchu (TW)

(72) Inventors: Chao-Chun Lu, Taipei (TW); Wen-Kuo Lin, Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 194 days.

(21) Appl. No.: 15/170,951

(22) Filed: Jun. 2, 2016

(65) Prior Publication Data
US 2016/0360183 A1 Dec. 8, 2016

Related U.S. Application Data

(60) Provisional application No. 62/169,569, filed on Jun. 2, 2015.

(51) Int. Cl.
| | | |
|---|---|---|
| *H04N 13/00* | (2018.01) | |
| *H04N 13/239* | (2018.01) | |
| *H04N 13/271* | (2018.01) | |

(52) U.S. Cl.
CPC ......... *H04N 13/239* (2018.05); *H04N 13/271* (2018.05)

(58) Field of Classification Search
CPC .............. H04N 13/0239; H04N 13/0271
See application file for complete search history.

(56) References Cited

U.S. PATENT DOCUMENTS

| | | | | |
|---|---|---|---|---|
| 8,761,457 B1* | 6/2014 | Seitz | .................... | G06K 9/6202 382/113 |
| 2006/0280360 A1* | 12/2006 | Holub | ....................... | G01J 3/02 382/162 |
| 2009/0128482 A1* | 5/2009 | Richardson | ............. | G06F 3/012 345/156 |
| 2012/0280977 A1* | 11/2012 | Cheng | ................ | H04N 13/0022 13/22 |
| 2012/0293635 A1* | 11/2012 | Sharma | .............. | G06K 9/00234 348/50 |
| 2013/0038723 A1* | 2/2013 | Tsutsumi | .................. | G01S 5/16 348/139 |

(Continued)

FOREIGN PATENT DOCUMENTS

| | | |
|---|---|---|
| CN | 103054584 A | 4/2013 |
| CN | 103827891 A | 5/2014 |
| CN | 104408396 A | 3/2015 |

*Primary Examiner* — Zhihan Zhou
(74) *Attorney, Agent, or Firm* — Winston Hsu

(57) ABSTRACT

A monitor system includes at least one three-dimensional camera circuit and a controller. Each of the at least one three-dimensional camera circuit is used for capturing a plurality of images including an object, and generating a depth map corresponding to the object according to the plurality of images. The controller is used for determining a plurality of feature points corresponding to the object according to the plurality of images or depth map, determining relative coordinates of the plurality of feature points according to the depth map, generating external information corresponding to the object according to the relative coordinates of the plurality of feature points, and generating monitor information corresponding to the object according to the external information corresponding to the object and reference parameters corresponding to the object.

20 Claims, 15 Drawing Sheets

(56) References Cited

U.S. PATENT DOCUMENTS

| | | | |
|---|---|---|---|
| 2013/0070052 A1* | 3/2013 | Yamashita | H04N 13/0022 348/43 |
| 2013/0141360 A1* | 6/2013 | Compton | G06F 1/1632 345/173 |
| 2014/0002607 A1* | 1/2014 | Shotton | H04N 13/0203 348/46 |
| 2014/0018960 A1* | 1/2014 | Itkowitz | A61B 19/2203 700/264 |
| 2014/0245367 A1* | 8/2014 | Sasaki | H04N 21/4402 725/109 |
| 2015/0055929 A1* | 2/2015 | Van Hoff | G11B 27/11 386/201 |
| 2015/0286859 A1* | 10/2015 | Zaytsev | G06F 3/017 382/103 |
| 2016/0025327 A1* | 1/2016 | Abe | G03B 21/204 348/744 |
| 2016/0142627 A1* | 5/2016 | Chou | G06T 7/593 348/240.2 |

* cited by examiner

MONITOR SYSTEM AND OPERATION METHOD THEREOF

CROSS REFERENCE TO RELATED APPLICATIONS

This application claims the benefit of U.S. Provisional Application No. 62/169,569, filed on Jun. 2, 2015 and entitled "Monitor system using 3D camera circuit," the contents of which are incorporated herein by reference.

BACKGROUND OF THE INVENTION

1. Field of the Invention

The present invention relates to a monitor system and an operation method thereof, and particularly to a monitor system and an operation method thereof that can utilize each three-dimensional camera circuit of at least one three-dimensional camera circuit to capture a plurality of images including an object and generate a depth map corresponding to the object according to the plurality of images, utilize a controller to determine a plurality of feature points corresponding to the object according to the plurality of images including the object or the depth map corresponding to the object, utilize the controller to determine relative coordinates of the plurality of feature points corresponding to the object according to the depth map corresponding to the object, utilize the controller to generate an external information corresponding to the object according to the relative coordinates of the plurality of feature points corresponding to the object, and utilize the controller to generate an monitor information corresponding to the object according to the external information corresponding to the object and reference parameters corresponding to the object

2. Description of the Prior Art

Nowadays, a monitor system is widely applied to various fields, such as a monitoring field, an environmental protection field, a health care field, and so on. Taking the health care field as an example, the monitor system needs to use traditional precision equipment (e.g. Computed Tomography) to provide detailed and accurate data. In the health care field, the prior art utilize sensors attached a skin of a person to sense data corresponding to activity of the person. Although the prior art can real time provide data corresponding to a posture (e.g. a walking posture, a standing posture, a sitting posture) of the person and a position of a body of the person, the prior art has higher cost and the data corresponding to the posture of the person and the position of the body of the person need to be interpreted by medical professionals. Therefore, the prior art is still not suitable for general home care.

SUMMARY OF THE INVENTION

An embodiment of the present invention provides a monitor system. The monitor system includes at least one three-dimensional camera circuit and a controller. Each three-dimensional camera circuit of the at least one three-dimensional camera circuit is used for capturing a plurality of images including an object, and generating a depth map corresponding to the object according to the plurality of images. The controller is used for determining a plurality of feature points corresponding to the object according to the plurality of images or the depth map, determining relative coordinates of the plurality of feature points and determining external information corresponding to the object, and generating monitor information corresponding to the object.

Another embodiment of the present invention provides an operation method of a monitor system, wherein the monitor system includes at least one three-dimensional camera circuit, a controller, a storage circuit, and a display, and each three-dimensional camera circuit of the at least one three-dimensional camera circuit includes a first image sensor, a second image sensor, and a depth map generator. The operation method includes the each three-dimensional camera circuit capturing a plurality of images including an object, and generating a depth map corresponding to the object according to the plurality of images; the controller determining a plurality of feature points corresponding to the object according to the plurality of images or the depth map; the controller determining relative coordinates of the plurality of feature points and determining external information corresponding to the object; and the controller generating monitor information corresponding to the object.

The present invention provides a monitor system and an operation method thereof. The monitor system and the operation method utilize each three-dimensional camera circuit of at least one three-dimensional camera circuit to capture a plurality of images including an object and generate a depth map corresponding to the object according to the plurality of images, utilize a controller to determine feature points corresponding to the object according to the plurality of images including the object or the depth map corresponding to the object, utilize the controller to determine relative coordinates of the feature points corresponding to the object according to the depth map corresponding to the object, utilize the controller to generate an external information corresponding to the object according to the relative coordinates of the feature points corresponding to the object, and utilize the controller to generate an monitor information corresponding to the object according to the external information corresponding to the object and reference parameters corresponding to the object. Because the monitor system provided by the present invention does not need expensive precision sensors, the monitor system provided by the present invention has lower cost and is easy to use. Therefore, compared to the prior art, the present invention is more suitable for general home care and farm management.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
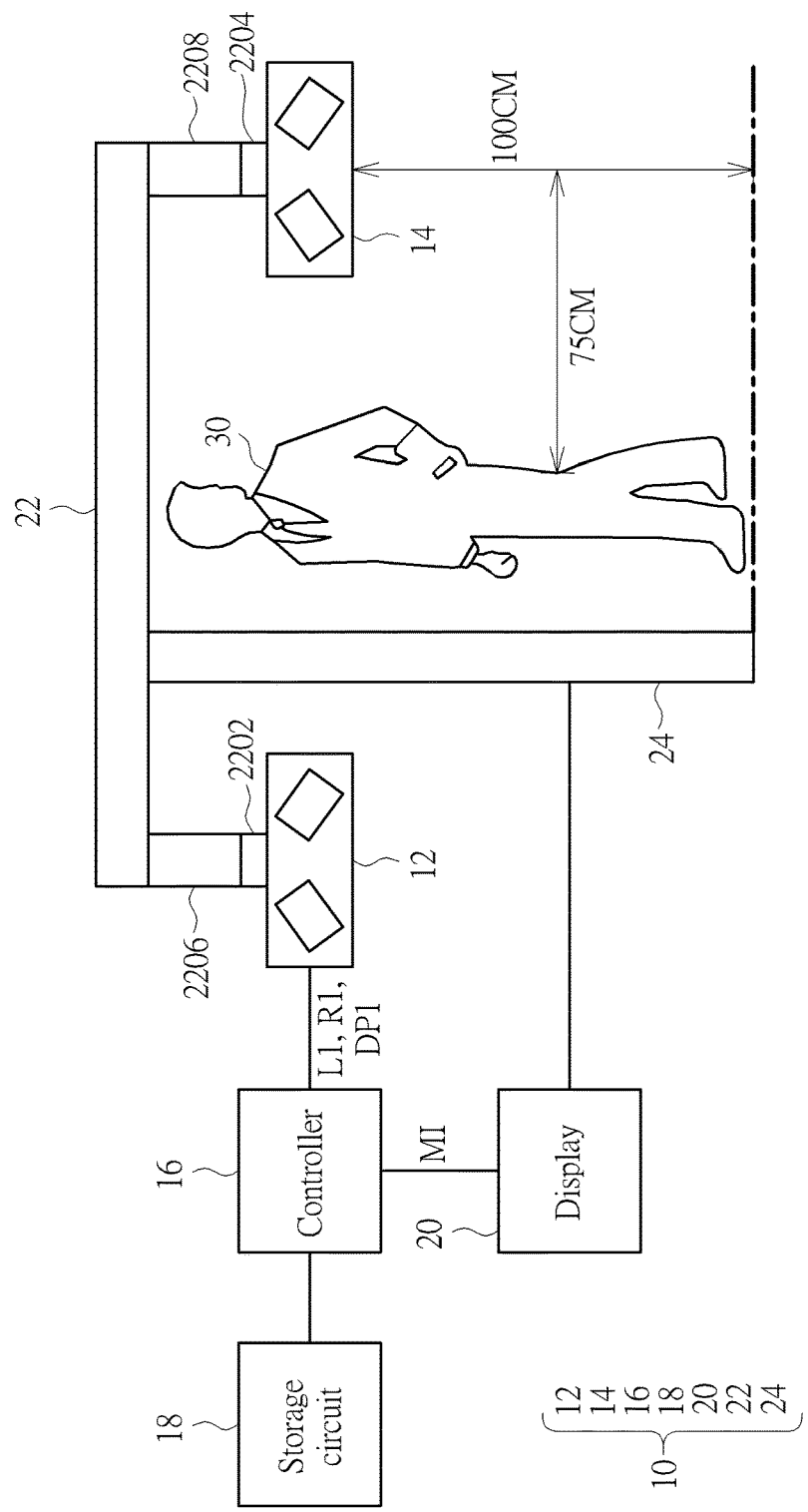
FIG. 1 is a diagram illustrating a monitor system according to a first embodiment of the present invention.
Figure 2:
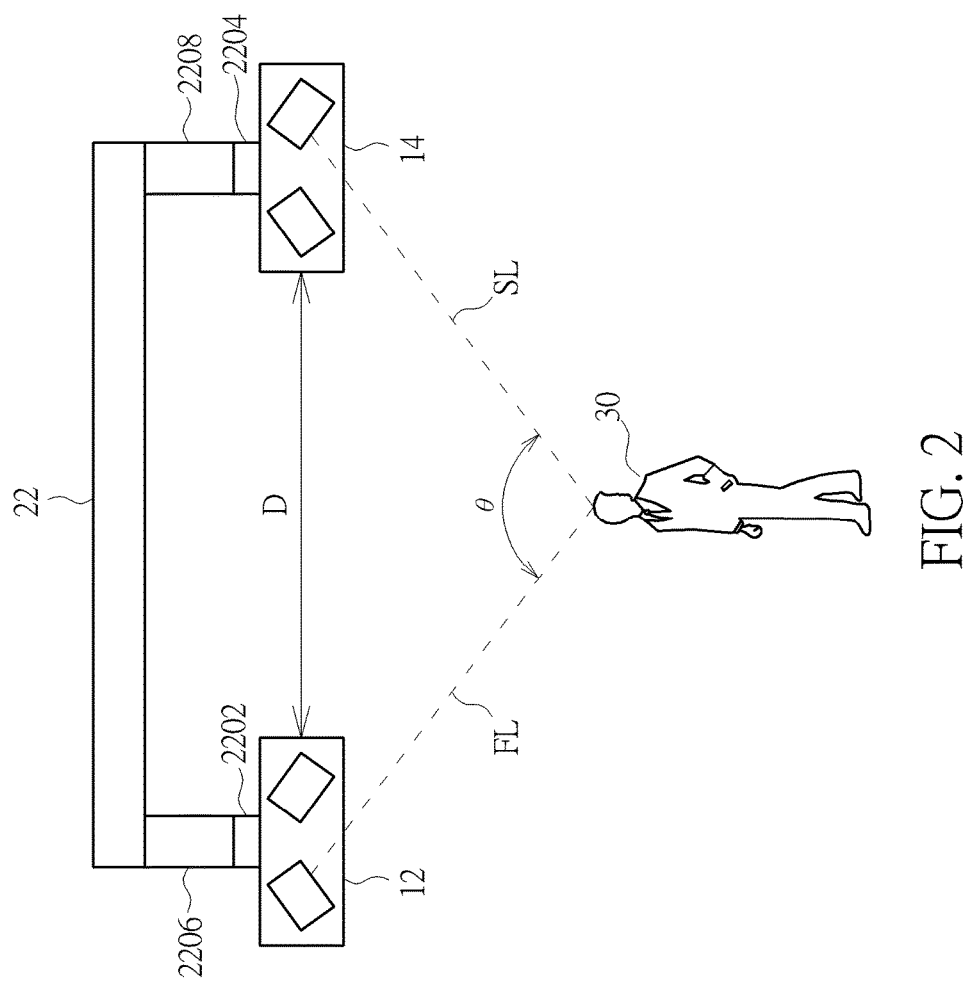
FIG. 2 is a diagram illustrating an angle determined by the two three-dimensional camera circuits and the object being adjustable.

Please refer to FIG. 1. FIG. 1 is a diagram illustrating a monitor system 10 according to a first embodiment of the present invention. As shown in FIG. 1, the monitor system 10 includes two three-dimensional camera circuits 12, 14, a controller 16, a storage circuit 18, a display 20, a support 22, and a vertical slide 24, wherein each three-dimensional camera circuit of the three-dimensional camera circuits 12, 14 is used for capturing a plurality of images including an object 30 (e.g. a person shown in FIG. 1) and generating a depth map corresponding to the object 30 according to the plurality of images including the object 30, and the storage circuit 18 and the display 20 coupled to the controller 16. But, the present invention is not limited to monitor system 10 including the three-dimensional camera circuits 12, 14. That is to say, the monitor system 10 can include at least one three-dimensional camera circuit. As shown in FIG. 1, the support 22 has two slots 2202, 2204, wherein the three-dimensional camera circuits 12, 14 are installed on the slots 2202, 2204, respectively, each slot of the slots 2202, 2204 is coupled to the support 22 through a corresponding movement device (e.g. the slot 2202 is coupled to the support 22 through a movement device 2206, and the slot 2204 is coupled to the support 22 through a movement device 2208), each slot of the slots 2202, 2204 is a Universal Serial Bus (USB) slot, and the support 22 is installed on the ground or a wall very easily. But, the present invention is not limited to the slots 2202, 2204 being USB slots. Therefore, as shown in FIG. 1, the three-dimensional camera circuit 12 can be moved toward the object 30 or moved away from the object 30 through the movement device 2206, and the three-dimensional camera circuit 14 can also be moved toward the object 30 or moved away from the object 30 through the movement device 2208. That is to say, a distance D (shown in FIG. 2) between the three-dimensional camera circuit 12 and the three-dimensional camera circuit 14 is adjustable. In addition, because the three-dimensional camera circuit 12 can be swung through the slot 2202 and the movement device 2206, and the three-dimensional camera circuit 14 can also be swung through the slot 2204 and the movement device 2208, an angle θ (shown in FIG. 2) determined by a line FL determined by the three-dimensional camera circuit 12 and the object 30 and a line SL determined by the three-dimensional camera circuit 14 and the object 30 is also adjustable. In addition, the three-dimensional camera circuit 12 can also be moved up and down through the movement device 2206, and the three-dimensional camera circuit 14 can also be moved up and down through the movement device 2208. In addition, the present invention is not limited to the support 22 having the slots 2202, 2204. That is to say, the support 22 can have more than two slots, so other three-dimensional camera circuits different from the three-dimensional camera circuits 12, 14 can be installed on other slots different from the slots 2202, 2204. As shown in FIG. 1, the controller 16 can control the vertical slide 24 to make the support 22 be smoothly moved top-down or bottom-up.

Figure 3:
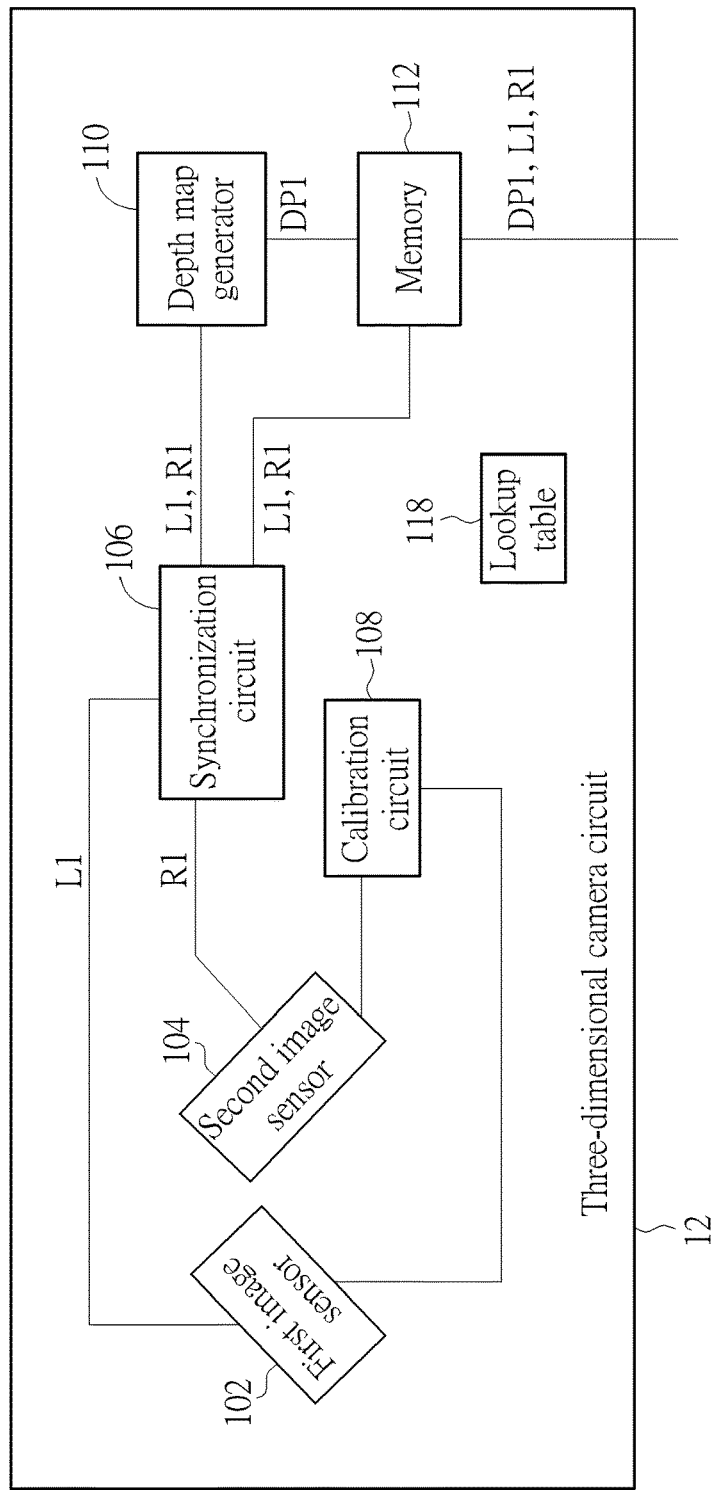
FIG. 3 is a diagram illustrating the three-dimensional camera circuit.

Please refer to FIG. 3. FIG. 3 is a diagram illustrating the three-dimensional camera circuit 12. As shown in FIG. 3, the three-dimensional camera circuit 12 includes a first image sensor 102, a second image sensor 104, a synchronization circuit 106, a calibration circuit 108, a depth map generator 110, and a memory 112, wherein the first image sensor 102 and the second image sensor 104 are charge-coupled device (CCD) sensors or contact image sensors. In addition, the present invention is not limited to the three-dimensional camera circuit 12 only including the first image sensor 102 and the second image sensor 104. That is to say, the three-dimensional camera circuit 12 can include at least two image sensors. When the object 30 is located within an image capture range ICR (shown in FIG. 4) of the three-dimensional camera circuit 12, the first image sensor 102 captures a first image L1 including the object 30, and the second image sensor 104 captures a second image R1 including the object 30, wherein the first image L1 corresponds to the second image R1, the first image L1 and the second image R1 are RGB images or YUV images, and the first image L1 is a left eye image and the second image R1 is a right eye image. But, the present invention is not limited to the first image L1 and the second image R1 being RGB images or YUV images. That is to say, the first image L1 and the second image R1 can be other types of color images. As shown in FIG. 3, the synchronization circuit 106 is coupled to the first image sensor 102, the second image sensor 104, and the depth map generator 110 for outputting a first synchronization signal to the first image L1 and a corresponding second synchronization signal to the second image R1, wherein a frequency of the first synchronization signal outputted by the synchronization circuit 106 and a frequency of the second synchronization signal outputted by the synchronization circuit 106 are varied with a resolution of the first image L1 and a resolution of the second image R1, wherein the first synchronization signal and the corresponding second synchronization signal are the same or different. But, in another embodiment of the present invention, the first image L1 and the second image R1 can be divided into a plurality of image blocks according to scan lines of the first image sensor 102, respectively, wherein the synchronization circuit 106 can output a synchronization signal to each image block of a plurality of image blocks of the first image L1, and the synchronization circuit 106 can also output a corresponding synchronization signal to a corresponding image block of a plurality of image blocks of the second image R1. In one embodiment of the present invention, each image block of the plurality of image blocks of the first image L1 is data corresponding to a scan line of the first image sensor 102 and each image block of the plurality of image blocks of the second image R1 is data corresponding to a scan line of the second image sensor 104, so memory space for storing the plurality of image blocks of the first image L1 and the plurality of image blocks of the second image R1 can be reduced. In addition, in another embodiment of the present invention, the three-dimensional camera circuit 12 further includes a register, and the register is used for storing an image block of the first image L1 corresponding to each scan line of the first image sensor 102 and a corresponding image block of the second image R1, wherein after the register completely stores image blocks of the first image L1 corresponding to scan lines of the first image sensor 102 and corresponding image blocks of the second image R1, the register outputs the first image L1 and the second image R1 according to a system clock of the three-dimensional camera circuit 12 to the depth map generator 110.

The calibration circuit 108 is coupled to the first image sensor 102 and the second image sensor 104, and before the first image sensor 102 outputs the first image L1 and the second image sensor 104 outputs the second image R1, the calibration circuit 108 executes calibration processing on the first image L1 and the second image R1, wherein the calibration processing includes a combination of a color space calibration and an assembly calibration. In addition, in another embodiment of the present invention, the calibration circuit 108 executes the calibration processing on the first image L1 and the second image R1 after the first image sensor 102 outputs the first image L1 and the second image sensor 104 outputs the second image R1. As shown in FIG. 3, after the depth map generator 110 receives the first image L1 and the second image R1, the depth map generator 110 can process the first image L1 and the second image R1 together to generate a depth map DP1 corresponding to the object 30 according to the first synchronization signal and the corresponding second synchronization signal. That is to say, the depth map generator 110 can generate the depth map DP1 according to each scan line of the first image L1 and a corresponding scan line of the second image R1 in turn. As shown in FIG. 3, the memory 112 is coupled to the synchronization circuit 106 and the depth map generator 110 for storing the first image L1, the second image R1, and the depth map DP1. But, in another embodiment of the present invention, the three-dimensional camera circuit 12 outputs the depth map DP1 real time, so meanwhile, the memory 112 of the three-dimensional camera circuit 12 is not necessary. In addition, in one embodiment of the present invention, all or part of the first image sensor 102, the second image sensor 104, the synchronization circuit 106, the calibration circuit 108, the depth map generator 110, and the memory 112 are integrated into a monolithic chip. In addition, in another embodiment of the present invention, when the first image sensor 102 captures a plurality of first images L1, L2, L3, . . . including the object 30, and the second image sensor 104 captures a plurality of second images R1, R2, R3, . . . including the object 30, the depth map generator 110 can generate depth maps DP1, DP2, DP3, . . . corresponding to the object 30 according to the above mentioned principles.

Figure 4:
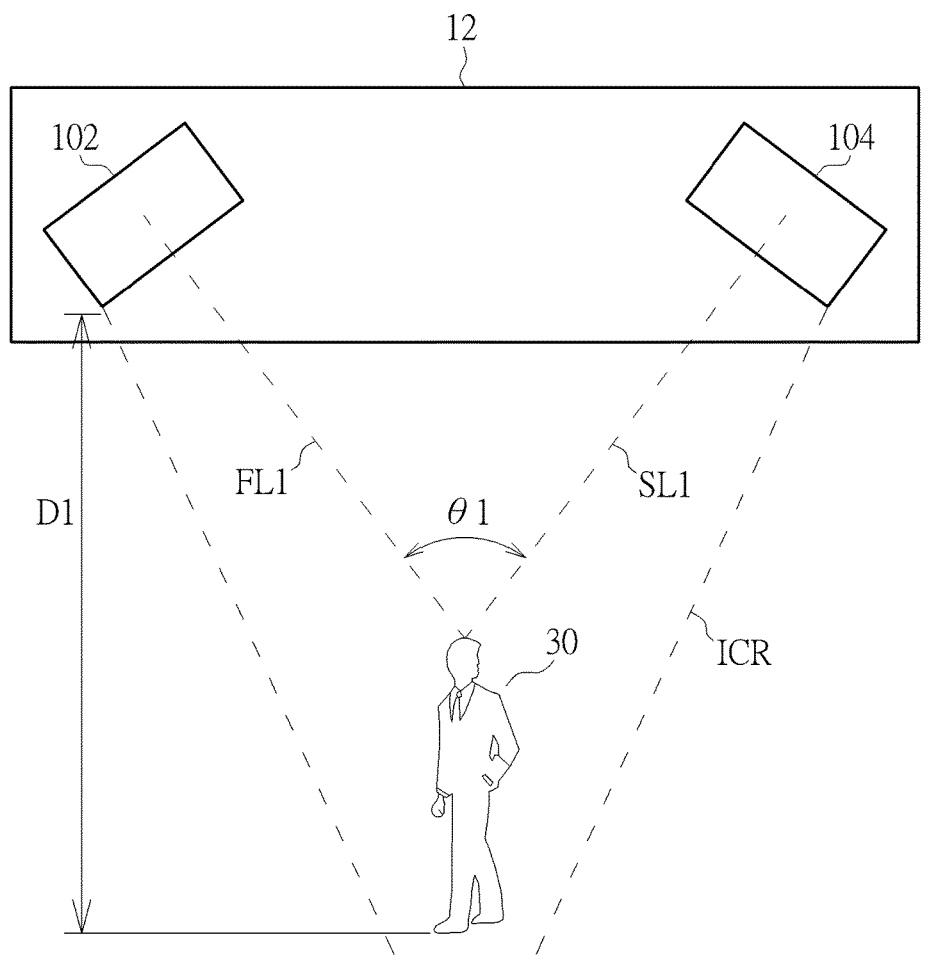
FIG. 4 is a diagram illustrating the corresponding distance existing between the first image sensor and the object when the first image sensor captures the first image.
Figure 5:
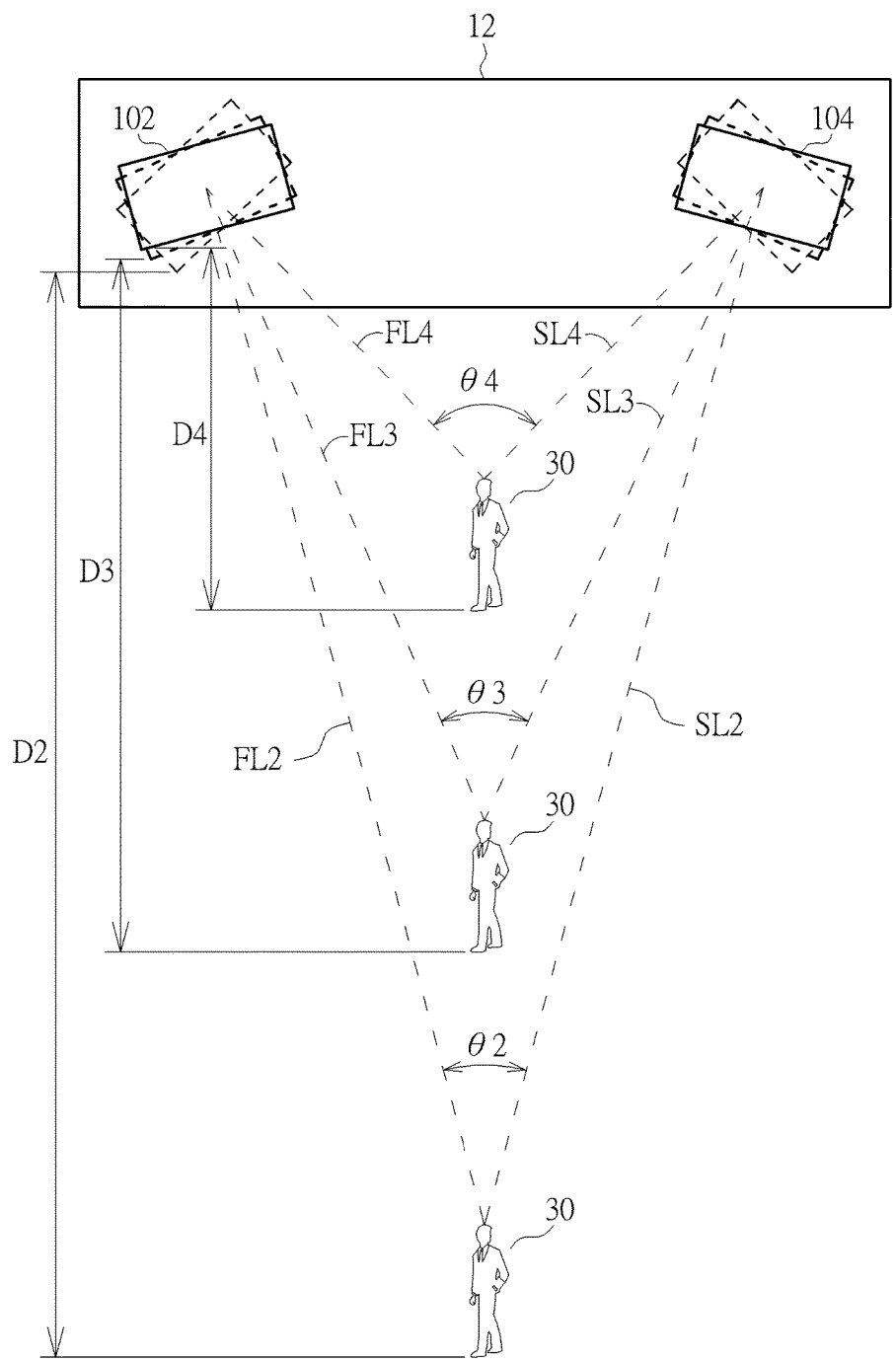
FIG. 5 is a diagram illustrating the first image sensor and the second image sensor being swung to make the object be always located at an intersection of a line determined by a center of the first image sensor and the object and a line determined by a center of the second image sensor and the object when a corresponding distance between the first image sensor and the object is varied with motion or rotation of the object.

As shown in FIG. 4 (wherein in FIG. 4, the three-dimensional camera circuit 12 only shows the first image sensor 102 and the second image sensor 104), when the first image sensor 102 captures the first image L1, a corresponding distance D1 exists between the first image sensor 102 of the three-dimensional camera circuit 12 and the object 30, wherein the corresponding distance D1 corresponds to the depth map DP1, and the corresponding distance D1 is varied with time. As shown in FIG. 4, when the first image sensor 102 captures the first image L1, the corresponding distance D1 exists between the first image sensor 102 and the object 30, a corresponding angle θ1 exists between a line FL1 determined by a center of the first image sensor 102 and the object 30 and a line SL1 determined by a center of the second image sensor 104 and the object 30, and the object 30 is located at an intersection of the line FL1 and the line SL1. In addition, because when the three-dimensional camera circuit 12 scans the object 30, the object 30 can be moved or rotated arbitrarily, a corresponding distance between the first image sensor 102 of the three-dimensional camera circuit 12 and the object 30 can be varied with motion or rotation of the object 30. That is to say, when a corresponding distance between the first image sensor 102 of the three-dimensional camera circuit 12 and the object 30 is changed with motion or rotation of the object 30, the first image sensor 102 and the second image sensor 104 can be swung to make the object 30 be always located at an intersection of a line determined by the center of the first image sensor 102 and the object 30 and a line determined by the center of the second image sensor 104 and the object 30 (as shown in FIG. 5). As shown in FIG. 5, when a corresponding distance D2 exists between the first image sensor 102 of the three-dimensional camera circuit 12 and the object 30, a corresponding angle θ2 exists between a line FL2 determined by the center of the first image sensor 102 and the object 30 and a line SL2 determined by the center of the second image sensor 104 and the object 30, wherein the corresponding distance D2 corresponds to a depth map DP2 generated by the depth map generator 110; when a corresponding distance D3 exists between the first image sensor 102 of the three-dimensional camera circuit 12 and the object 30, a corresponding angle θ3 exists between a line FL3 determined by the center of the first image sensor 102 and the object 30 and a line SL3 determined by the center of the second image sensor 104 and the object 30, wherein the corresponding distance D3 corresponds to a depth map DP3 generated by the depth map generator 110; and when a corresponding distance D4 exists between the first image sensor 102 of the three-dimensional camera circuit 12 and the object 30, a corresponding angle θ4 exists between a line FL4 determined by the center of the first image sensor 102 and the object 30 and a line SL4 determined by the center of the second image sensor 104 and the object 30, wherein the corresponding distance D4 corresponds to a depth map DP4 generated by the depth map generator 110. As shown in FIG. 5, because the first image sensor 102 and the second image sensor 104 can be swung, no matter how the object 30 is mover or rotated, the three-dimensional camera circuit 12 can always make the object 30 be located at an intersection of a line determined by the center of the first image sensor 102 and the object 30 and a line determined by the center of the second image sensor 104 and the object 30. In addition, because the first image sensor 102 and the second image sensor 104 can be swung, compared to the prior art, a size of the object 30 can be less restricted and the depth maps DP1, DP2, DP3, . . . generated by the three-dimensional camera circuit 12 can have fewer errors.

In addition, the three-dimensional camera circuit 12 further includes a lookup table 118, wherein the lookup table 118 is used for storing relationships between corresponding distances (e.g. the corresponding distances D1, D2, D3, . . . ) between the first image sensor 102 of the three-dimensional camera circuit 12 and the object 30, corresponding angles (e.g. the corresponding angles θ1, θ2, θ3, . . . ) determined by a line determined by the center of the first image sensor 102 and the object 30 and a line determined by the center of the second image sensor 104 and the object 30, and depth maps (e.g. the depth maps DP1, DP2, DP3, . . . ).

Figure 6:
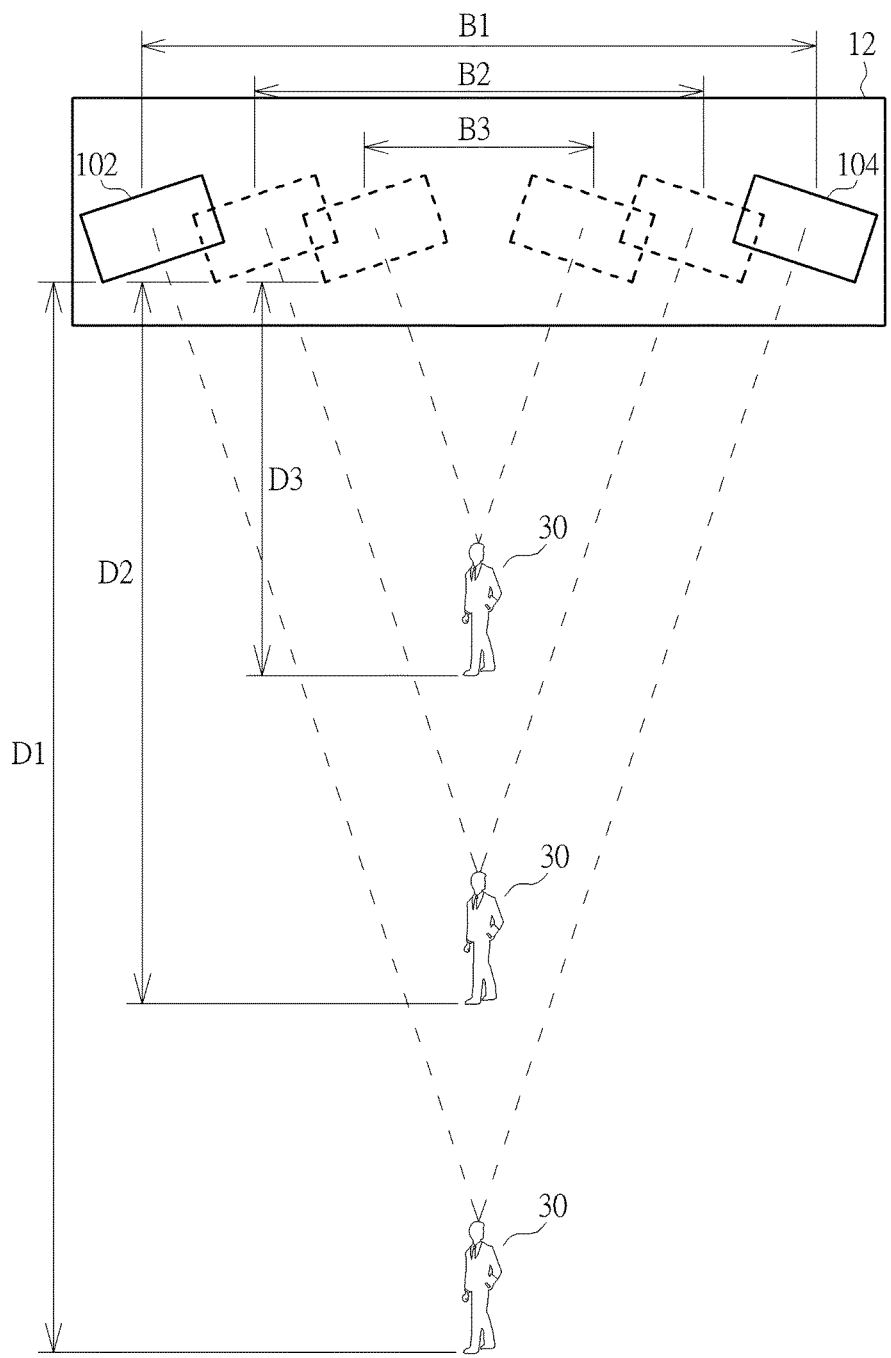
FIG. 6 is a diagram illustrating a baseline between the first image sensor and the second image sensor being varied with a corresponding distance between the first image sensor and the object according to another embodiment of the present invention.

Please refer to FIG. 6. FIG. 6 is a diagram illustrating a baseline between the first image sensor 102 and the second image sensor 104 being varied with a corresponding distance between the first image sensor 102 and the object 30 according to another embodiment of the present invention. As shown in FIG. 6, when the corresponding distance D1 exists between the first image sensor 102 of the three-dimensional camera circuit 12 and the object 30, a baseline B1 exists between the first image sensor 102 and the second image sensor 104; when the corresponding distance D2 exists between the first image sensor 102 of the three-dimensional camera circuit 12 and the object 30, a baseline B2 exists between the first image sensor 102 and the second image sensor 104; and when the corresponding distance D3 exists between the first image sensor 102 of the three-dimensional camera circuit 12 and the object 30, a baseline B3 exists between the first image sensor 102 and the second image sensor 104. As shown in FIG. 6, because a baseline existing between the first image sensor 102 and the second image sensor 104 can be varied with a corresponding distance between the first image sensor 102 of the three-dimensional camera circuit 12 and the object 30, no matter how the object 30 is mover or rotated, the three-dimensional camera circuit 12 can always make the object 30 be located at an intersection of a line determined by the center of the first image sensor 102 and the object 30 and a line determined by the center of the second image sensor 104 and the object 30. In addition, because a baseline existing between the first image sensor 102 and the second image sensor 104 can be varied with a corresponding distance between the first image sensor 102 of the three-dimensional camera circuit 12 and the object 30, compared to the prior art, the size of the object 30 can be less restricted and the depth maps DP1, DP2, DP3, . . . generated by the three-dimensional camera circuit 12 can have fewer errors.

In addition, the lookup table 118 included by the three-dimensional camera circuit 12 can be used for storing relationships between corresponding distances (e.g. the corresponding distances D1, D2, D3, . . . ) existing between the first image sensor 102 of the three-dimensional camera circuit 12 and the object 30, baselines (e.g. the baselines B1, B2, B3, . . . ) existing between the first image sensor 102 and the second image sensor 104, and depth maps (e.g. the depth maps DP1, DP2, DP3, . . . ).

In addition, in another embodiment of the present invention, a baseline between the first image sensor 102 and the second image sensor 104 can be varied with a corresponding distance between the first image sensor 102 of the three-dimensional camera circuit 12 and the object 30, and the first image sensor 102 and the second image sensor 104 can also be swung with a corresponding distance between the first image sensor 102 of the three-dimensional camera circuit 12 and the object 30. Therefore, the lookup table 118 included by the three-dimensional camera circuit 12 is used for storing relationships between corresponding distances (e.g. the corresponding distances D1, D2, D3, . . . ) existing between the first image sensor 102 of the three-dimensional camera circuit 12 and the object 30, corresponding angles (e.g. the corresponding angles θ1, θ2, θ3, . . . ) determined by a line determined by the center of the first image sensor 102 and the object 30 and a line determined by the center of the second image sensor 104 and the object 30, baselines (e.g. the baselines B1, B2, B3, . . . ) existing between the first image sensor 102 and the second image sensor 104, and depth maps (e.g. the depth maps DP1, DP2, DP3, . . . ).

Figure 7:
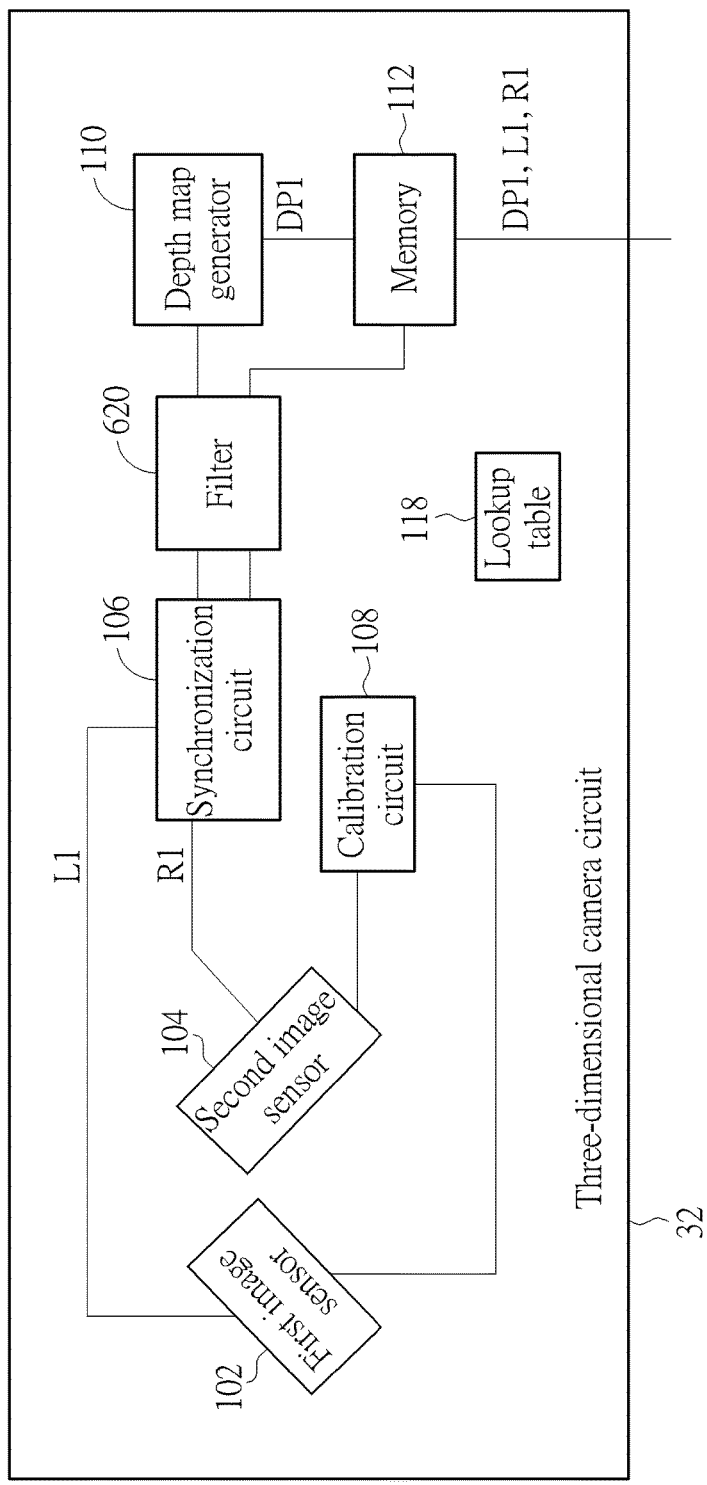
FIG. 7 is a diagram illustrating a three-dimensional camera circuit according to a second embodiment of the present invention.

Please refer to FIG. 7. FIG. 7 is a diagram illustrating a three-dimensional camera circuit 32 according to a second embodiment of the present invention. As shown in FIG. 7, a difference between the three-dimensional camera circuit 32 and the three-dimensional camera circuit 12 is that the three-dimensional camera circuit 32 further includes a filter 620, wherein the filter 620 is coupled between the first image sensor 102, the second image sensor 104, the depth map generator 110, and the memory 112. The filter 620 is used for converting the first image L1 captured by the first image sensor 102 and the second image R1 captured by the second image sensor 104 into monochrome images. Therefore, the depth map generator 110 can generate the depth map DP1 according to the monochrome first image L1 and the monochrome second image R1. In addition, subsequent operational principles of the three-dimensional camera circuit 32 are the same as those of the three-dimensional camera circuit 12, so further description thereof is omitted for simplicity.

Figure 8:
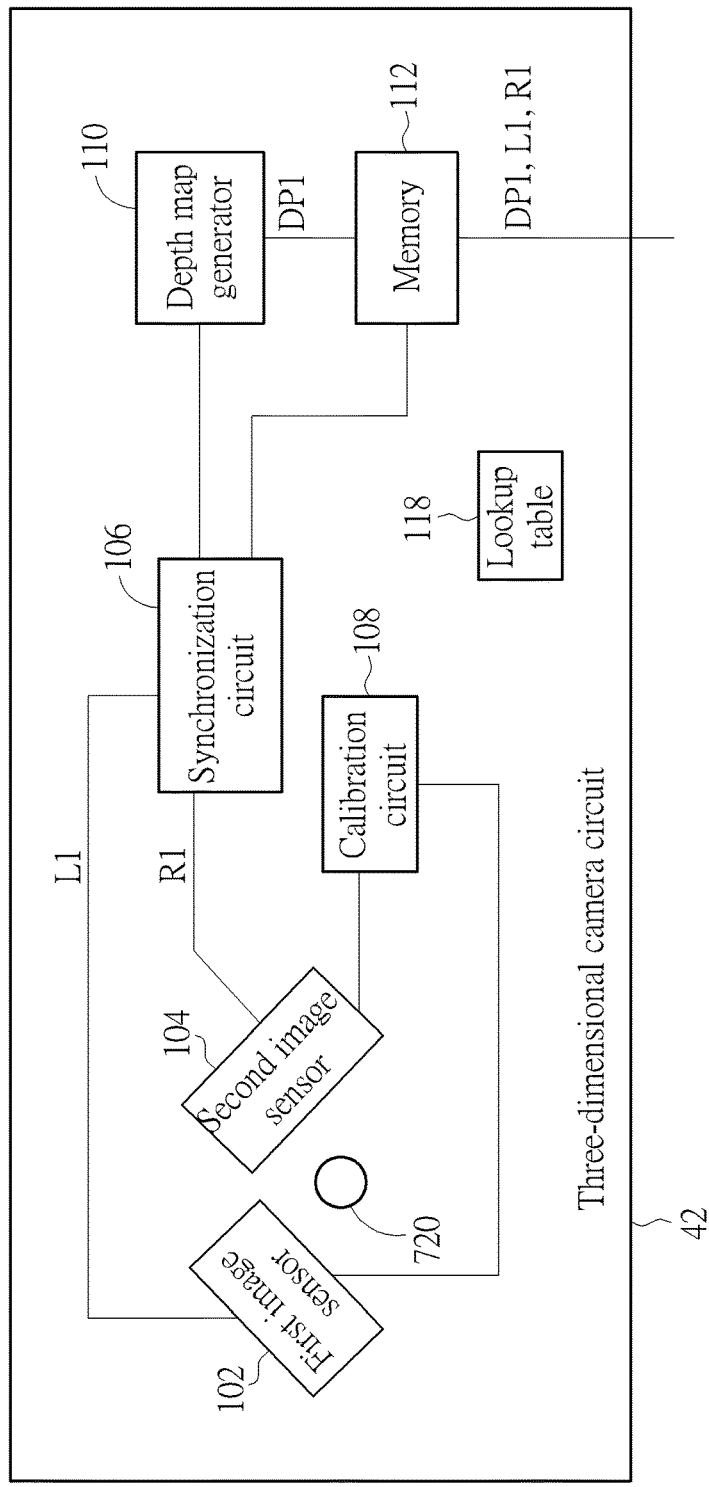
FIG. 8 is a diagram illustrating a three-dimensional camera circuit according to a third embodiment of the present invention.
Figure 9:
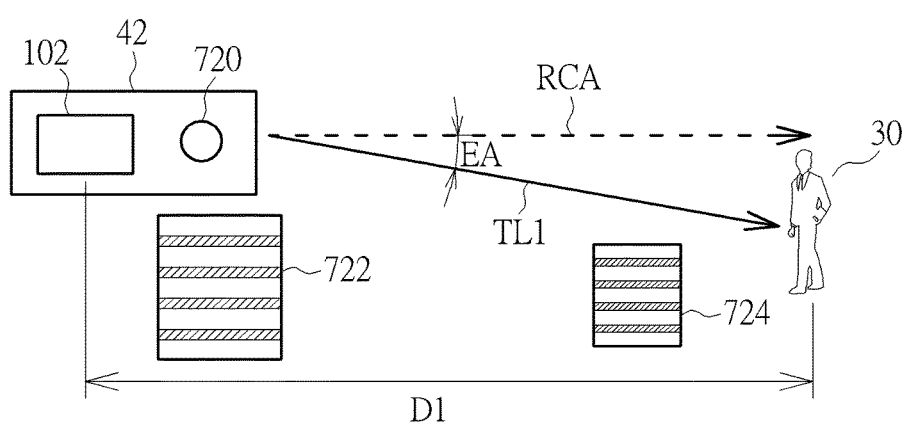
FIG. 9 is a diagram illustrating relationships between an emitting angle of a light source, the corresponding distance between the first image sensor of the three-dimensional camera circuit and the object, and a ratio of a size of a predetermined light pattern formed on a surface of the object to a size of a predetermined light pattern emitted by the light source.

Please refer to FIG. 8 and FIG. 9. FIG. 8 is a diagram illustrating a three-dimensional camera circuit 42 according to a third embodiment of the present invention, and FIG. 9 is a diagram illustrating relationships between an emitting angle of a light source 720, the corresponding distance D1 between the first image sensor 102 of the three-dimensional camera circuit 42 and the object 30, and a ratio RA of a size of a predetermined light pattern 724 formed on a surface of the object 30 to a size of a predetermined light pattern 722 emitted by the light source 720. As shown in FIG. 8, a difference between the three-dimensional camera circuit 42 and the three-dimensional camera circuit 12 is that the three-dimensional camera circuit 42 further includes the light source 720, wherein the light source 720 can have different emitting angles. When the light source 720 emits the predetermined light pattern 722 (e.g. a strip pattern) to the object 30, the first image sensor 102 captures the first image L1 including the object 30, and the second image sensor 104 captures the second image R1 including the object 30. But, the present invention is not limited to the predetermined light pattern 722 being the strip pattern. As shown in FIG. 9, an emitting angle EA of the light source 720 is determined by a line TL1 determined by the light source 720 and the object 30 and a reference coordinate axis RCA, and when the corresponding distance D1 exists between the first image sensor 102 of the three-dimensional camera circuit 42 and the object 30 (in FIG. 9, the three-dimensional camera circuit 42 only shows the first image sensor 102 and the light source 720), the ratio RA can be determined by the size of the predetermined light pattern 724 formed on the surface of the object 30 and the size of the predetermined light pattern 722 emitted by the light source 720, wherein the ratio RA corresponds to the corresponding distance D1 and the emitting angle EA.

Figure 10:
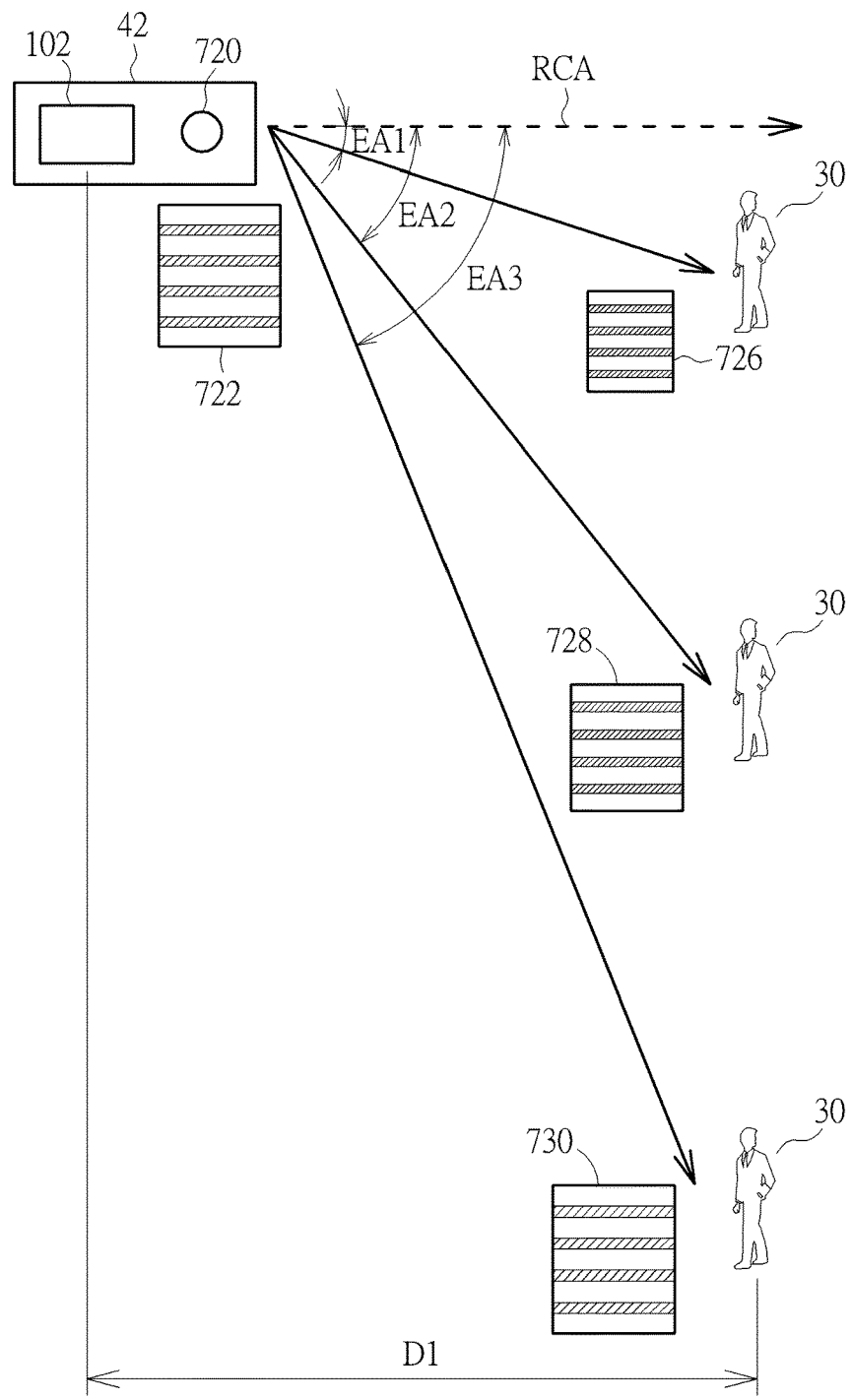
FIG. 10 is a diagram illustrating ratios determined by sizes of predetermined light patterns formed on the surface of the object and the size of the predetermined light pattern emitted by the light source being varied with different emitting angles of the light source when the corresponding distance exists between the first image sensor of the three-dimensional camera circuit and the object and the light source has the different emitting angles.
Figure 11:
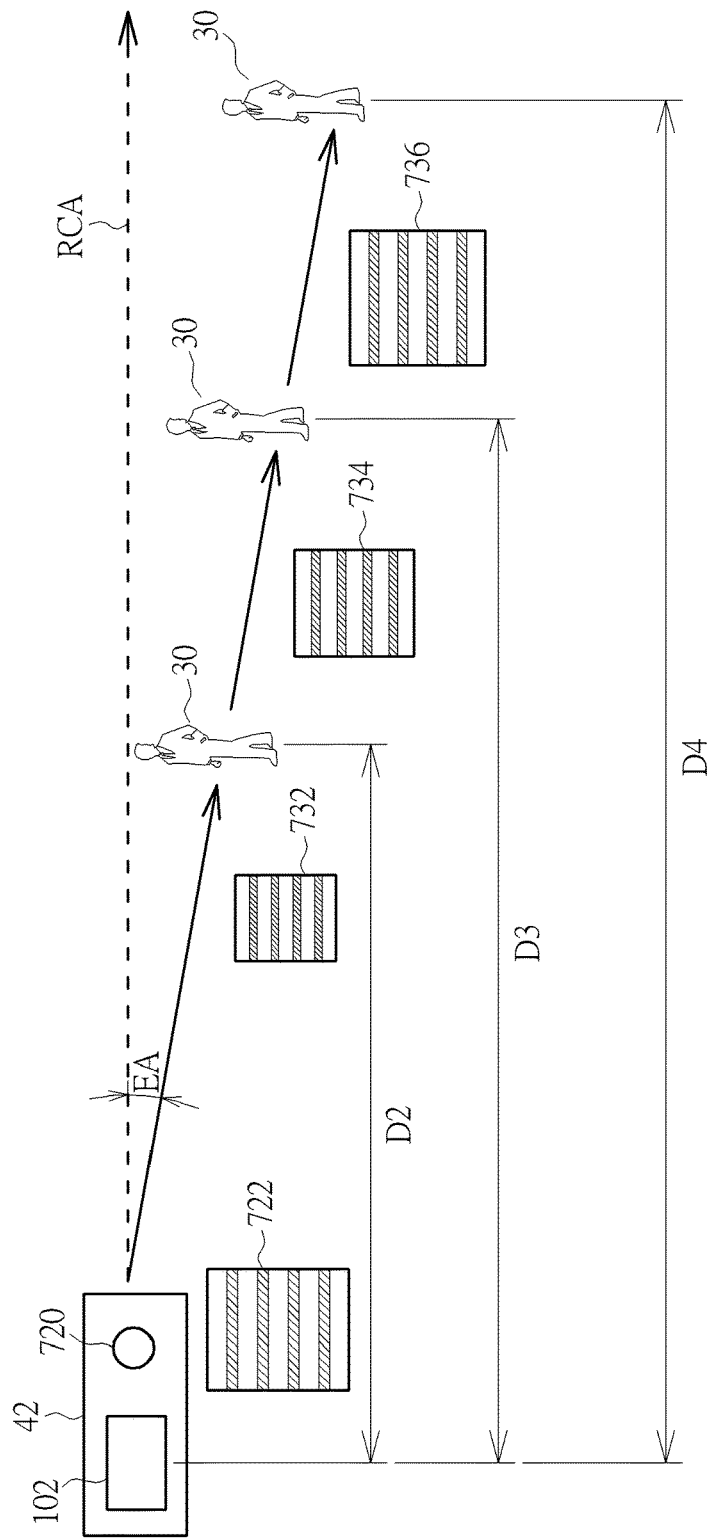
FIG. 11 is a diagram illustrating ratios determined by sizes of predetermined light patterns formed on the surface of the object and the size of the predetermined light pattern emitted by the light source being varied with different corresponding distances between the first image sensor of the three-dimensional camera circuit and the object when the different corresponding distances exist between the first image sensor of the three-dimensional camera circuit and the object and the light source has the emitting angle.

Please refer to FIG. 10 and FIG. 11. FIG. 10 is a diagram illustrating ratios determined by sizes of predetermined light patterns formed on the surface of the object 30 and the size of the predetermined light pattern 722 emitted by the light source 720 being varied with different emitting angles of the light source 720 when the corresponding distance D1 exists between the first image sensor 102 of the three-dimensional camera circuit 42 and the object 30 and the light source 720 has the different emitting angles, and FIG. 11 is a diagram illustrating ratios determined by sizes of predetermined light patterns formed on the surface of the object 30 and the size of the predetermined light pattern 722 emitted by the light source 720 being varied with different corresponding distances between the first image sensor 102 of the three-dimensional camera circuit 42 and the object 30 when the different corresponding distances exist between the first image sensor 102 of the three-dimensional camera circuit 42 and the object 30 and the light source 720 has the emitting angle EA. As shown in FIG. 10, when the corresponding distance D1 exists between the first image sensor 102 of the three-dimensional camera circuit 42 and the object 30 and the light source 720 has an emitting angle EA1 (in FIG. 10, the three-dimensional camera circuit 42 only shows the first image sensor 102 and the light source 720), a ratio RA1 can be determined by a size of a predetermined light pattern 726 formed on the surface of the object 30 and the size of the predetermined light pattern 722 emitted by the light source 720; when the corresponding distance D1 exists between the first image sensor 102 of the three-dimensional camera circuit 42 and the object 30 and the light source 720 has an emitting angle EA2, a ratio RA2 can be determined by a size of a predetermined light pattern 728 formed on the surface of the object 30 and the size of the predetermined light pattern 722 emitted by the light source 720; and when the corresponding distance D1 exists between the first image sensor 102 of the three-dimensional camera circuit 42 and the object 30 and the light source 720 has an emitting angle EA3, a ratio RA3 can be determined by a size of a predetermined light pattern 730 formed on the surface of the object 30 and the size of the predetermined light pattern 722 emitted by the light source 720, wherein the ratio RA1, the ratio RA2, and the ratio RA3 are different each other. As shown in FIG. 11, when the light source 720 has the emitting angle EA and the corresponding distance D2 exists between the first image sensor 102 of the three-dimensional camera circuit 42 and the object 30 (in FIG. 11, the three-dimensional camera circuit 42 only shows the first image sensor 102 and the light source 720), a ratio RA4 can be determined by a size of a predetermined light pattern 732 formed on the surface of the object 30 and the size of the predetermined light pattern 722 emitted by the light source 720; when the light source 720 has the emitting angle EA and the corresponding distance D3 exists between the first image sensor 102 of the three-dimensional camera circuit 42 and the object 30, a ratio RA5 can be determined by a size of a predetermined light pattern 734 formed on the surface of the object 30 and the size of the predetermined light pattern 722 emitted by the light source 720; and when the light source 720 has the emitting angle EA and the corresponding distance D4 exists between the first image sensor 102 of the three-dimensional camera circuit 42 and the object 30, a ratio RA6 can be determined by a size of a predetermined light pattern 736 formed on the surface of the object 30 and the size of the predetermined light pattern 722 emitted by the light source 720, wherein the ratio RA4, the ratio RA5, and the ratio RA6 are different each other. Therefore, the lookup table 118 included by the three-dimensional camera circuit 42 is used for storing relationships between corresponding distances (e.g. the corresponding distances D1, D2, D3, . . . ) existing between the first image sensor 102 of the three-dimensional camera circuit 42 and the object 30, emitting angles (e.g. the emitting angles EA, EA1, EA2, EA3, . . . ) of the light source 720, ratios (e.g. the ratios RA, RA1, RA2, RA3, . . . ) determined by a size of a predetermined light pattern (e.g. the predetermined light patterns 722, 724, 726, 728, . . . ) formed on the surface of the object 30 and the size of the predetermined light pattern 722 emitted by the light source 720, and depth maps (e.g. the depth maps DP1, DP2, DP3, . . . ). In addition, subsequent operational principles of the three-dimensional camera circuit 42 are the same as those of the three-dimensional camera circuit 12, so further description thereof is omitted for simplicity.

In addition, as shown in FIG. 1, the depth map DP1 generated by the depth map generator 110, the first image L1, and the second image R1 are transmitted to the controller 16 through a Universal Serial Bus. But, in another embodiment of the present invention, the depth map DP1 generated by the depth map generator 110, the first image L1, and the second image R1 are transmitted to the controller 16 through a mobile-industry-processor-interface (MIPI). In addition, in another embodiment of the present invention, the depth map DP1 generated by the depth map generator 110, the first image L1, and the second image R1 are transmitted to the controller 16 through a Wireless Fidelity (WiFi), a wireless LAN (WLAN), a Zigbee (IEEE 802.15.4), a Bluetooth, a Wireless Wide Area Network (WWAN), a Global System for Mobile Communications (GSM), a General Packet Radio Service (GPRS), a third generation (3G), a fourth generation (4G), a fifth generation (5G), or an actor network theory+ (Ant+).

In addition, components and operational principles of the three-dimensional camera circuit 14 are the same as those of the three-dimensional camera circuit 12, so further description thereof is omitted for simplicity.

Figure 12:
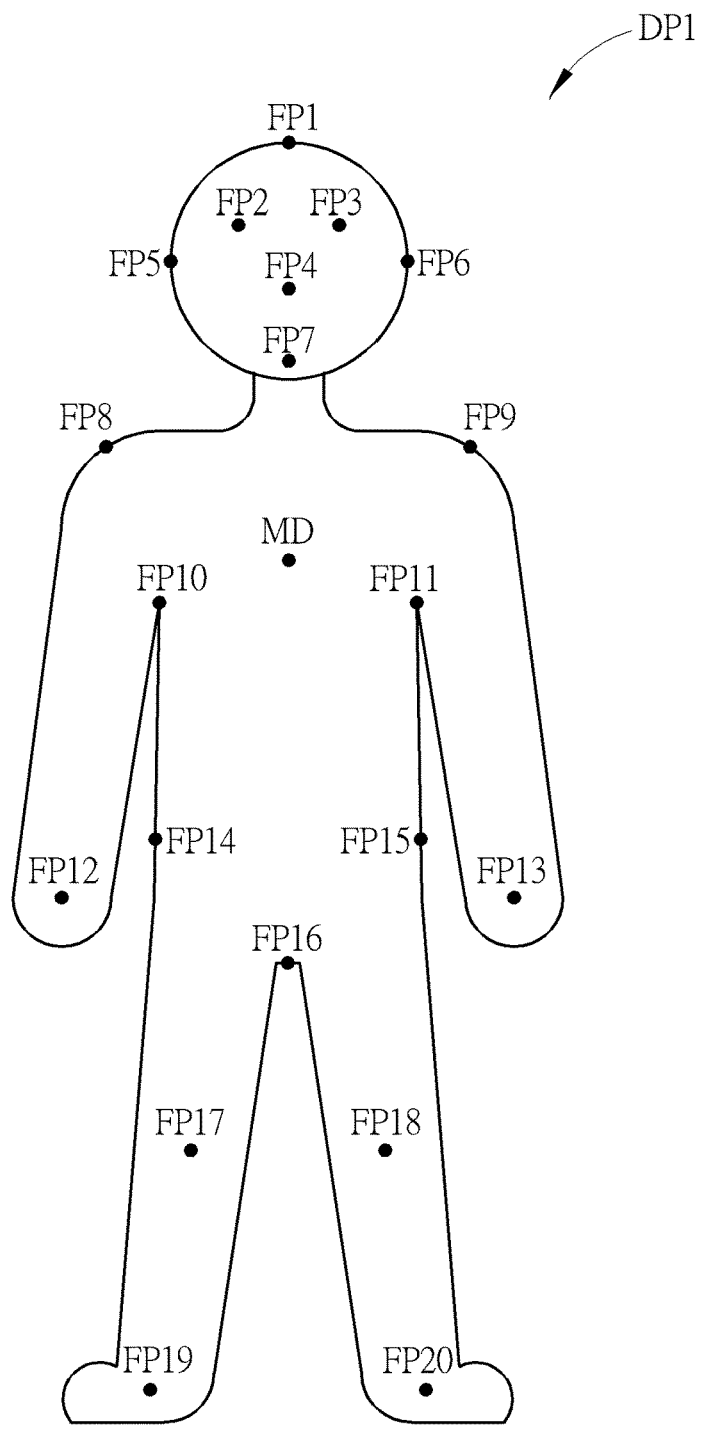
FIG. 12 is a diagram illustrating the controller determining feature points corresponding to the object according to the first image and the second image.

Please refer to FIG. 12. FIG. 12 is a diagram illustrating the controller 16 determining feature points FP1-FP20 corresponding to the object 30 according to the first image L1 and the second image R1. But, the present invention is not limited to a number of the feature points FP1-FP20 corresponding to the object 30 determined by the controller 16. As shown in FIG. 12, the controller 16 can determine the feature points FP1-FP7 corresponding to a face of the object 30 and the feature points FP8-FP20 corresponding to limbs and a trunk of the object 30 according to the first image L1 and the second image R1, or the depth map DP1. But, in another embodiment of the present invention, the controller 16 can determine the feature points FP1-FP7 corresponding to the face of the object 30 and the feature points FP8-FP20 corresponding to the limbs and the trunk of the object 30 according to the depth map DP1.

The controller 16 can determine relative coordinates of the feature points FP1-FP20 in the space according to the depth map DP1. Because the controller 16 can determine the relative coordinates of the feature points FP1-FP20 in the space according to the depth map DP1, the controller 16 can track the relative coordinates of the feature points FP1-FP20 in the space, and generate external information corresponding to the object 30 according to the relative coordinates of the feature points FP1-FP20 in the space, wherein when the object 30 is the person shown in FIG. 1, the external information corresponding to the object 30 includes at least one of a chest circumference, a waistline, a hip, a shoulder width, a hand length, a leg length, a size of a head, a walking posture, and a curvature angle of a spine of the person. For example, the controller 16 can generate a size of the face and the size of the head of the object 30 according to the relative coordinates of the feature points FP1-FP7 in the space, generate the shoulder width of the object 30 according to the relative coordinates of the feature points FP8, FP9 in the space, generate the chest circumference of the object 30 according to the relative coordinates of the feature points FP10, FP11 in the space, generate the hand length of the object 30 according to the relative coordinates of the feature points FP8, FP9, FP12, FP13 in the space, generate the waistline of the object 30 according to the relative coordinates of the feature points FP14, FP15 in the space, and generate the leg length of the object 30 according to the relative coordinates of the feature points FP14, FP15, FP17-FP20 in the space. In addition, the controller 16 can also generate the curvature angle of the spine of the object 30 according to a midpoint MD determined by the feature points FP10, FP11, and the relative coordinate of the feature point FP16 in the space. In addition, the controller 16 can also determine a thickness of a chest and a humpback condition corresponding to the object 30 simultaneously according to the above mentioned principles and depth maps generated by three-dimensional camera circuits 12, 14. In addition, the present invention is not limited to locations of the feature points FP1-FP20 shown in FIG. 12. In addition, because when the monitor system 10 operates, the three-dimensional camera circuits 12, 14 can be moved through the movement devices 2206, 2208 respectively to make the object 30 be always located between the three-dimensional camera circuits 12, 14, and the angle θ determined by the line FL and the line SL is adjustable, the monitor system 10 can generate the more accurate external information corresponding to the object 30. In addition, in one embodiment of the present invention, 100 centimeters exists between each three-dimensional camera circuit of the three-dimensional camera circuits 12, 14 and the ground, and 75 centimeters exists between the each three-dimensional camera circuit of the three-dimensional camera circuits 12, 14 and the object 30.

After the controller 16 generates the external information corresponding to the object 30 according to the relative coordinates of the feature points FP1-FP20 in the space, the controller 16 can generate a monitor information MI corresponding to the object 30 according to reference parameters corresponding to the object 30 stored in the storage circuit 18 and the external information corresponding to the object 30 (e.g. the controller 16 can generate offsets between the reference parameters corresponding to the object 30 and the external information corresponding to the object 30 according to the reference parameters corresponding to the object 30 stored in the storage circuit 18 and the external information corresponding to the object 30). After the controller 16 generates the offsets between the reference parameters corresponding to the object 30 and the external information corresponding to the object 30, the controller 16 can generate suggestions or instructions corresponding to the object 30 according to the offsets, and control the display 20 to display the monitor information MI, or display the suggestions or the instructions corresponding to the object 30, or simultaneously display the monitor information MI and the suggestions or the instructions corresponding to the object 30. For example, the controller 16 can suggest the object 30 to adjust a stand posture thereof to reduce the curvature angle of the spine of the object 30 according to the offsets through the display 20, or the controller 16 can suggest the object 30 to increase exercise time and exercise intensity per week thereof to reduce the waistline, the hip, and so on thereof according to the offsets through the display 20.

In addition, in another embodiment of the present invention, after the controller 16 generates the offsets between the reference parameters corresponding to the object 30 and the external information corresponding to the object 30, the controller 16 can transmit the offsets to a general practitioner clinic which the object 30 belongs to through the Internet. Then, at least one doctor of the general practitioner clinic will transmit replies corresponding to the object 30 to the controller 16 according to the offsets. After the controller 16 receives the replies corresponding to the object 30, the controller 16 can control the display 20 to display the replies corresponding to the object 30 to the object 30.

Because the display 20 can be any audio/video device to display the above mentioned replies corresponding to the object 30, the monitor information MI, or the suggestions or the instructions corresponding to the object 30, the object 30 can use the monitor system 10 very easily without needing personally to go to the general practitioner clinic which the object 30 belongs to.

Figure 13:
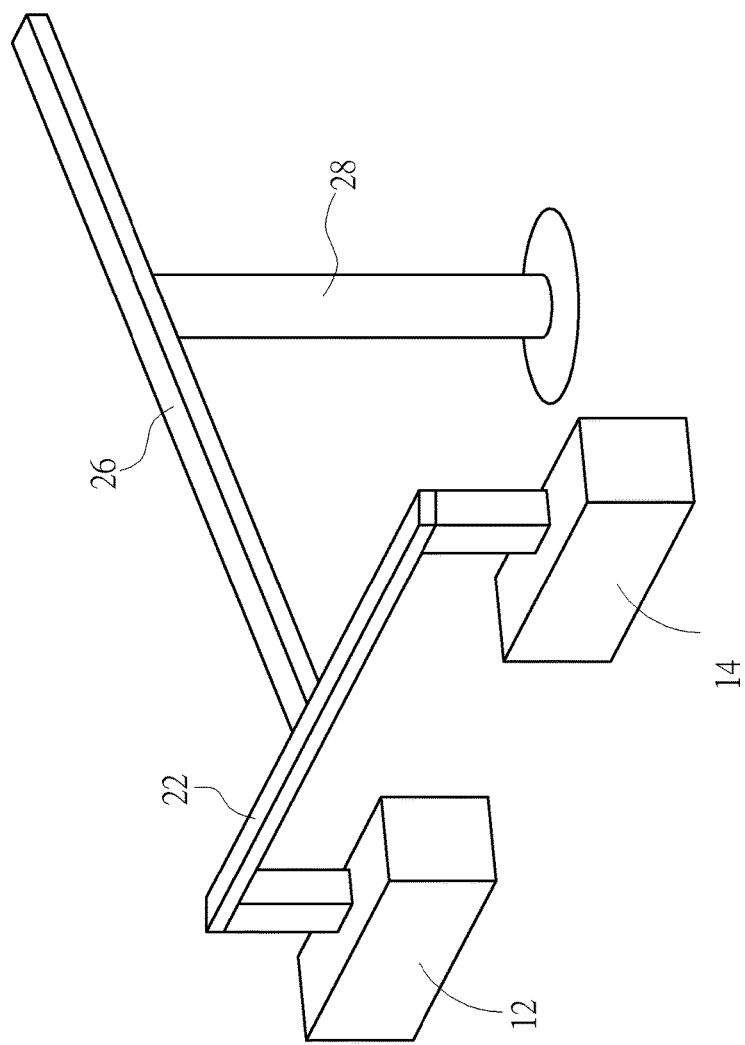
FIG. 13 is a diagram illustrating the support and a horizontal slide according to a fourth embodiment of the present invention.

Please refer to FIG. 13. FIG. 13 is a diagram illustrating the support 22 and a horizontal slide 26 according to a fourth embodiment of the present invention. As shown in FIG. 13, the controller 16 can control the support 22 to move horizontally on the horizontal slide 26 according to movement patterns pre-stored in the storage circuit 18, wherein the horizontal slide 26 is installed on a pillar 28, and the support 22 can be moved on the horizontal slide 26 in a constant speed mode or a variable speed mode. In addition, the controller 16 can also make the horizontal slide 26 be smoothly moved on the pillar 28 top-down or bottom-up according to another movement pattern pre-stored in the storage circuit 18. In addition, the present invention is not limited to installation relationships between the horizontal slide 26 and the pillar 28 and appearances of the horizontal slide 26 and the pillar 28 shown in FIG. 13. That is to say, any that the support 22 can be moved horizontally on the horizontal slide 26 and the horizontal slide 26 can be smoothly moved on the pillar 28 top-down or bottom-up falls within the scope of the present invention. As shown in FIG. 13, because the support 22 can be moved on the horizontal slide 26, and the horizontal slide 26 can be moved on the pillar 28 top-down or bottom-up, the fourth embodiment of the present invention can be applied to a farm (e.g. an orchard or a vegetable garden). That is to say, when the monitor system shown in the fourth embodiment of the present invention is applied to the orchard, a farmer owning the orchard can determine whether to fertilize fruits produced by the orchard (e.g. sizes of the fruits produced by the orchard are less than reference parameters corresponding to the fruits stored in the storage circuit 18) or whether to worm the fruits (e.g. appearances of the fruits appear that the fruits have been damaged by worms) according to a monitor information (e.g. the sizes or the appearances of the fruits) corresponding to the fruits generated by the monitor system shown in the fourth embodiment of the present invention without personally visiting the orchard.

Figure 14:
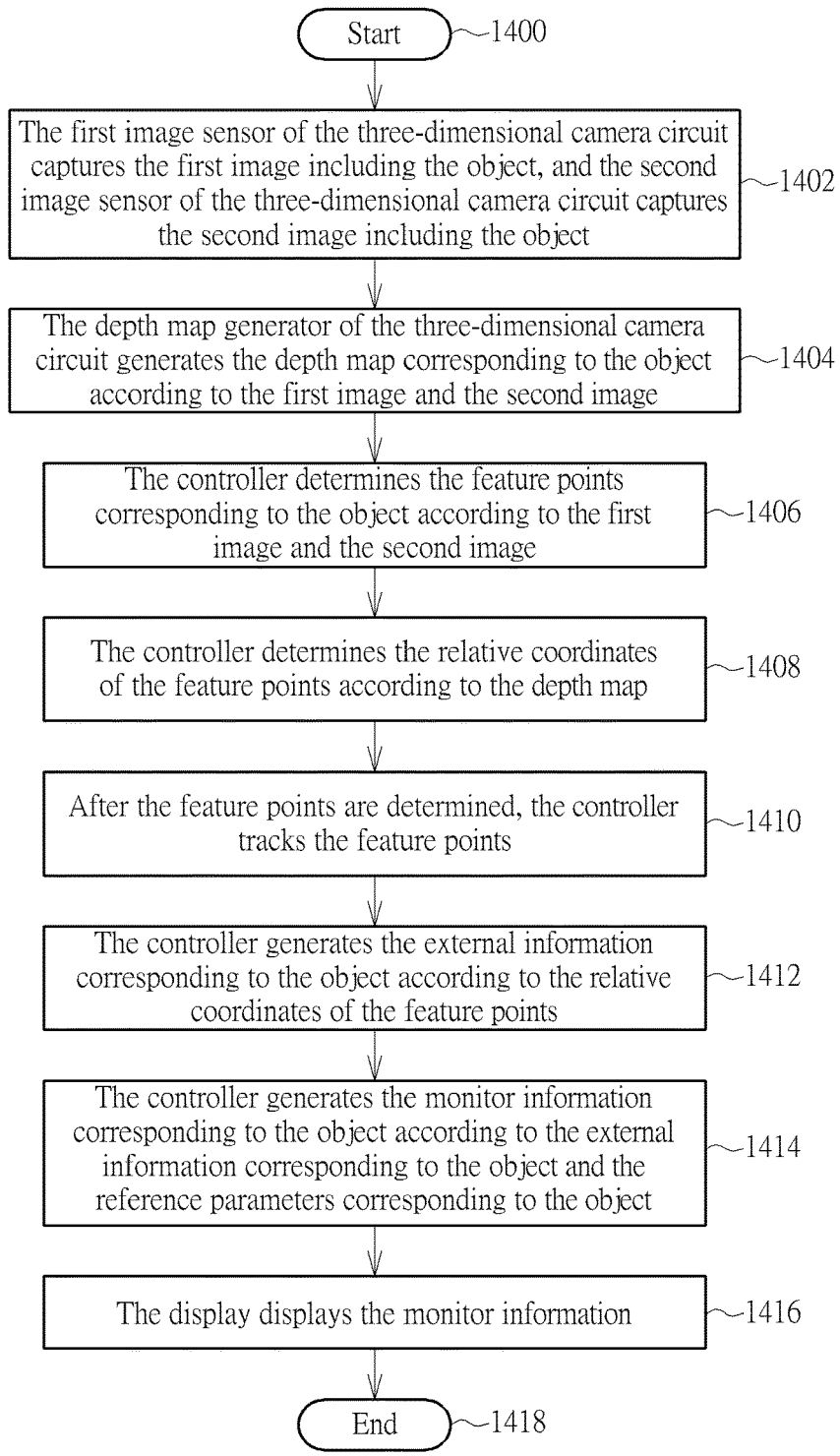
FIG. 14 is a flowchart illustrating an operation method of a monitor system according to a fifth embodiment of the present invention.

Please refer to FIGS. 1, 2, 3, 12, 13, 14. FIG. 14 is a flowchart illustrating an operation method of a monitor system according to a fifth embodiment of the present invention. The operation method in FIG. 14 is illustrated using the monitor system 10 in FIG. 1 and the three-dimensional camera circuit 12 in FIG. 3. Detailed steps are as follows:

Step 1400: Start.

Step 1402: The first image sensor 102 of the three-dimensional camera circuit 12 captures the first image L1 including the object 30, and the second image sensor 104 of the three-dimensional camera circuit 12 captures the second image R1 including the object 30.

Step 1404: The depth map generator 110 of the three-dimensional camera circuit 12 generates the depth map DP1 corresponding to the object 30 according to the first image L1 and the second image R1.

Step 1406: The controller 16 determines the feature points FP1-FP20 corresponding to the object 30 according to the first image L1 and the second image R1.

Step 1408: The controller 16 determines the relative coordinates of the feature points FP1-FP20 according to the depth map DP1.

Step 1410: After the feature points FP1-FP20 are determined, the controller 16 tracks the feature points FP1-FP20.

Step 1412: The controller 16 generates the external information corresponding to the object 30 according to the relative coordinates of the feature points FP1-FP20.

Step 1414: The controller 16 generates the monitor information MI corresponding to the object 30 according to the external information corresponding to the object 30 and the reference parameters corresponding to the object 30.

Step 1416: The display 20 displays the monitor information MI.

Step 1418: End.

In Step 1404, as shown in FIG. 3, after the depth map generator 110 receives the first image L1 and the second image R1, the depth map generator 110 can process the first image L1 and the second image R1 together to generate the depth map DP1 corresponding to the object 30 according to the first synchronization signal and the corresponding second synchronization signal outputted by the synchronization circuit 106. That is to say, the depth map generator 110 can generate the depth map DP1 according to each scan line of the first image L1 and a corresponding scan line of the second image R1 in turn. In addition, in another embodiment of the present invention, when the first image sensor 102 captures the plurality of first images L1, L2, L3, . . . including the object 30, and the second image sensor 104 captures the plurality of second images R1, R2, R3, . . . including the object 30, the depth map generator 110 can generate the depth maps DP1, DP2, DP3, . . . corresponding to the object 30 according to the above mentioned principles.

In Step 1406 and Step 1408, as shown in FIG. 12, the controller 16 can determine the feature points FP1-FP7 corresponding to the face of the object 30 and the feature points FP8-FP20 corresponding to the limbs and the trunk of the object 30 according to the first image L1 and the second image R1, and determine the relative coordinates of the feature points FP1-FP20 in the space according to the depth map DP1. But, in another embodiment of the present invention, the controller 16 can determine the feature points FP1-FP20 corresponding to the object 30 according to the depth map DP1.

In Step 1410, because the controller 16 can determine the relative coordinates of the feature points FP1-FP20 in the space according to the depth map DP1, the controller 16 can track the relative coordinates of the feature points FP1-FP20 in the space, and in Step 1412, the controller 16 can generate the external information corresponding to the object 30 according to the relative coordinates of the feature points FP1-FP20 in the space, wherein when the object 30 is the person shown in FIG. 1, the external information corresponding to the object 30 includes at least one of the chest circumference, the waistline, the hip, the shoulder width, the hand length, the leg length, the size of the head, the walking posture, and the curvature angle of the spine of the person. For example, the controller 16 can determine the size of the face and the size of the head of the object 30 according to the relative coordinates of the feature points FP1-FP7 in the space, determine the shoulder width of the object 30 according to the relative coordinates of the feature points FP8, FP9 in the space, determine the chest circumference of the object 30 according to the relative coordinates of the feature points FP10, FP11 in the space, determine the hand length of the object 30 according to the relative coordinates of the feature points FP8, FP9, FP12, FP13 in the space, determine the waistline of the object 30 according to the relative coordinates of the feature points FP14, FP15 in the space, and determine the leg length of the object 30 according to the relative coordinates of the feature points FP14, FP15, FP17-FP20 in the space. In addition, the controller 16 can also determine the curvature angle of the spine of the object 30 according to the midpoint MD determined by the feature points FP10, FP11, and the relative coordinate of the feature point FP16 in the space. In addition, because the components and the operational principles of the three-dimensional camera circuit 14 are the same as those of the three-dimensional camera circuit 12, the controller 16 can also determine the thickness of the chest and the humpback condition corresponding to the object 30 simultaneously according to the above mentioned principles and depth maps generated by three-dimensional camera circuits 12, 14. In addition, because when the monitor system 10 operates, the three-dimensional camera circuits 12, 14 can be moved through the movement devices 2206, 2208 respectively to make the object 30 be always located between the three-dimensional camera circuits 12, 14, and the angle θ determined by the line FL and the line SL is adjustable, the monitor system 10 can generate the more accurate external information corresponding to the object 30.

In Step 1414, after the controller 16 generates the external information corresponding to the object 30 according to the relative coordinates of the feature points FP1-FP20 in the space, the controller 16 can generate the monitor information MI corresponding to the object 30 according to the reference parameters corresponding to the object 30 stored in the storage circuit 18 and the external information corresponding to the object 30 (e.g. the controller 16 can generate the offsets between the reference parameters corresponding to the object 30 and the external information corresponding to the object 30 according to the reference parameters corresponding to the object 30 stored in the storage circuit 18 and the external information corresponding to the object 30). In Step 1416, after the controller 16 generates the offsets between the reference parameters corresponding to the object 30 and the external information corresponding to the object 30, the controller 16 can generate the suggestions or the instructions corresponding to the object 30 according to the offsets, and control the display 20 to display the monitor information MI, or display the suggestions or the instructions corresponding to the object 30, or simultaneously display the monitor information MI and the suggestions or the instructions corresponding to the object 30. For example, the controller 16 can suggest the object 30 to adjust the stand posture thereof to reduce the curvature angle of the spine of the object 30 according to the offsets through the display 20, or the controller 16 can suggest the object 30 to increase exercise time and exercise intensity per week thereof to reduce the waistline, the hip, and so on thereof according to the offsets through the display 20. In addition, in another embodiment of the present invention, after the controller 16 generates the offsets between the reference parameters corresponding to the object 30 and the external information corresponding to the object 30, the controller 16 can transmit the offsets to the general practitioner clinic which the object 30 belongs to. Then, at least one doctor of the general practitioner clinic will transmit the replies corresponding to the object 30 to the controller 16 according to the offsets. After the controller 16 receives the replies corresponding to the object 30, the controller 16 can control the display 20 to display the replies corresponding to the object 30 to the object 30. Because the display 20 can be any audio/video device to display the above mentioned replies corresponding to the object 30, the monitor information MI, or the suggestions or the instructions corresponding to the object 30, the object 30 can use the monitor system 10 very easily without needing personally to go to the general practitioner clinic which the object 30 belongs to.

In addition, because the support 22 can be moved on the horizontal slide 26, and the horizontal slide 26 can be moved on the pillar 28 top-down or bottom-up, the present invention can be applied to a farm (e.g. the orchard or the vegetable garden). That is to say, when the monitor system shown in FIG. 13 is applied to the orchard, the farmer owning the orchard can determine whether to fertilize the fruits produced by the orchard (e.g. the sizes of the fruits produced by the orchard are less than the reference parameters corresponding to the fruits stored in the storage circuit 18) or whether to worm the fruits (e.g. the appearances of the fruits appear that the fruits have been damaged by worms) according to the monitor information (e.g. the sizes or the appearances of the fruits) corresponding to the fruits generated by the monitor system shown in FIG. 13 without personally visiting the orchard.

Figure 15:
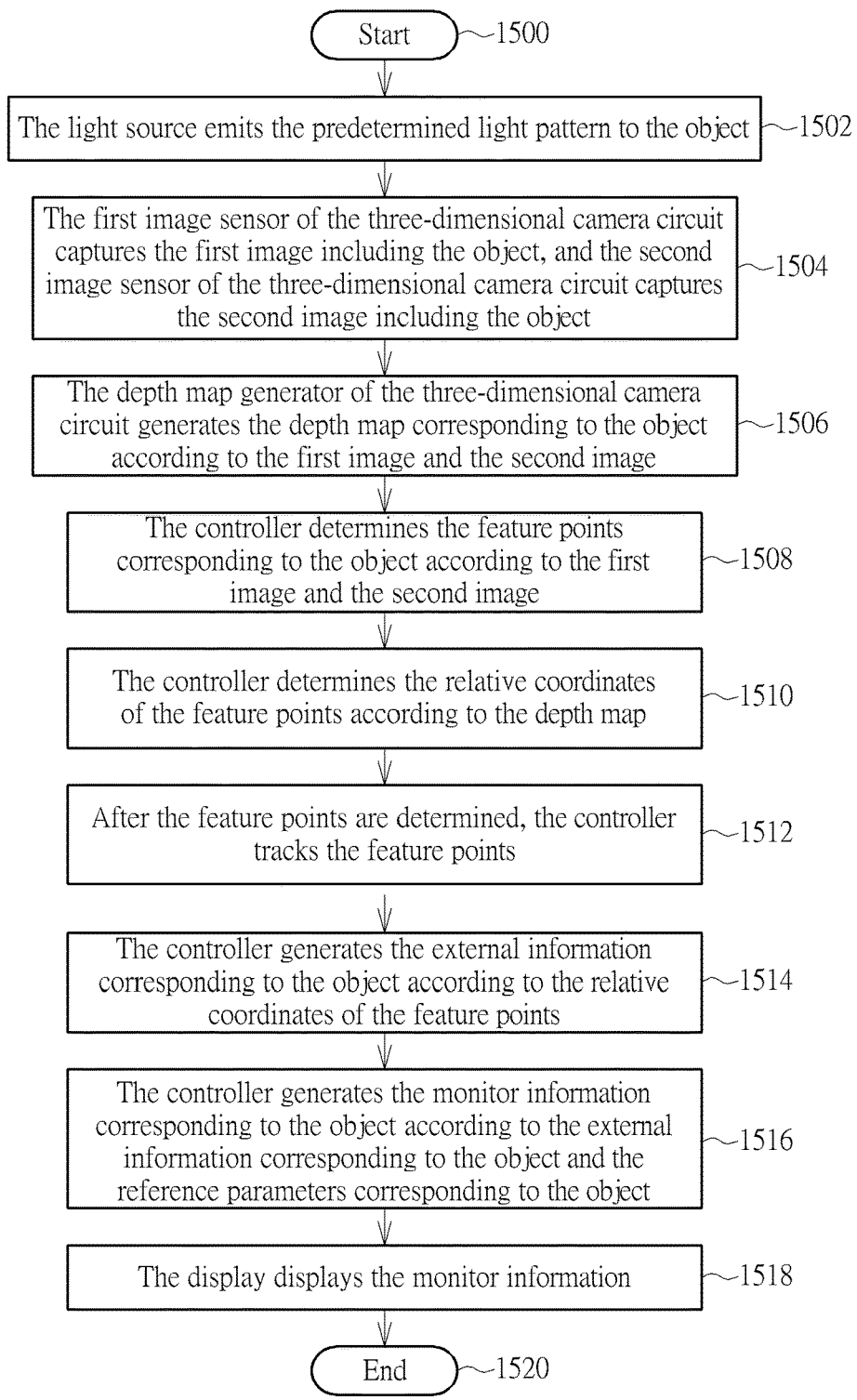
FIG. 15 is a flowchart illustrating an operation method of a monitor system according to a sixth embodiment of the present invention.

Please refer to FIGS. 1, 2, 8-13, 15. FIG. 15 is a flowchart illustrating an operation method of a monitor system according to a sixth embodiment of the present invention. The operation method in FIG. 15 is illustrated using the monitor system 10 in FIG. 1 and the three-dimensional camera circuit 42 in FIG. 8. Detailed steps are as follows:

Step 1500: Start.

Step 1502: The light source 720 emits the predetermined light pattern 722 to the object 30.

Step 1504: The first image sensor 102 of the three-dimensional camera circuit 42 captures the first image L1 including the object 30, and the second image sensor 104 of the three-dimensional camera circuit 42 captures the second image R1 including the object 30.

Step 1506: The depth map generator 110 of the three-dimensional camera circuit 42 generates the depth map DP1 corresponding to the object 30 according to the first image L1 and the second image R1.

Step 1508: The controller 16 determines the feature points FP1-FP20 corresponding to the object 30 according to the first image L1 and the second image R1.

Step 1510: The controller 16 determines the relative coordinates of the feature points FP1-FP20 according to the depth map DP1.

Step 1512: After the feature points FP1-FP20 are determined, the controller 16 tracks the feature points FP1-FP20.

Step 1514: The controller 16 generates the external information corresponding to the object 30 according to the relative coordinates of the feature points FP1-FP20.

Step 1516: The controller 16 generates the monitor information MI corresponding to the object 30 according to the external information corresponding to the object 30 and the reference parameters corresponding to the object 30.

Step 1518: The display 20 displays the monitor information MI.

Step 1520: End.

As shown in FIG. 8, a difference between the embodiment in FIG. 15 and the embodiment in FIG. 14 is that in Step 1502, when the light source 720 further included in the three-dimensional camera circuit 42 emits the predetermined light pattern 722 (e.g. a strip pattern) to the object 30, the first image sensor 102 captures the first image L1 including the object 30, and the second image sensor 104 captures the second image R1 including the object 30. But, the present invention is not limited to predetermined light pattern 722 being the strip pattern. As shown in FIG. 9, the emitting angle EA of the light source 720 is determined by the line TL1 determined by the light source 720 and the object 30 and the reference coordinate axis RCA, and when the corresponding distance D1 exists between the first image sensor 102 of the three-dimensional camera circuit 42 and the object 30 (in FIG. 9, the three-dimensional camera circuit 42 only shows the first image sensor 102 and the light source 720), the ratio RA can be determined by the size of the predetermined light pattern 724 formed on the surface of the object 30 and the size of the predetermined light pattern 722 emitted by the light source 720, wherein the ratio RA corresponds to the corresponding distance D1 and the emitting angle EA.

As shown in FIG. 10, when a corresponding distance (e.g. the corresponding distance D1) exists between the first image sensor 102 of the three-dimensional camera circuit 42 and the object 30, a ratio determined by a size of a predetermined light pattern (e.g. the predetermined light patterns 726, 728, 730) formed on the surface of the object 30 and the size of the predetermined light pattern 722 emitted by the light source 720 is varied with different emitting angles (e.g. the emitting angles EA1, EA2, EA3) of the light source 720. As shown in FIG. 11, when the light source 720 has an emitting angle (e.g. the emitting angle EA), a ratio determined by a size of a predetermined light pattern (e.g. the predetermined light patterns 732, 734, 736) formed on the surface of the object 30 and the size of the predetermined light pattern 722 emitted by the light source 720 is varied with different corresponding distances (e.g. the corresponding distance D2, D3, D4) between the first image sensor 102 of the three-dimensional camera circuit 42 and the object 30.

To sum up, the monitor system and the operation method thereof utilize each three-dimensional camera circuit of the at least one three-dimensional camera circuit to capture the plurality of images including the object and generate the depth map corresponding to the object according to the plurality of images, utilize the controller to determine the feature points corresponding to the object according to the plurality of images including the object or the depth map corresponding to the object, utilize the controller to determine the relative coordinates of the feature points corresponding to the object according to the depth map corresponding to the object, utilize the controller to generate the external information corresponding to the object according to the relative coordinates of the feature points corresponding to the object, and utilize the controller to generate the monitor information corresponding to the object according to the external information corresponding to the object and the reference parameters corresponding to the object. Because the monitor system provided by the present invention does not need expensive precision sensors, the monitor system provided by the present invention has lower cost and is easy to use. Therefore, compared to the prior art, the present invention is more suitable for general home care and farm management.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A monitor system, comprising:
   at least one three-dimensional camera circuit, wherein each three-dimensional camera circuit of the at least one three-dimensional camera circuit captures a plurality of images comprising an object, and generates a depth map corresponding to the object according to the plurality of images; and
   a controller determining a plurality of feature points corresponding to the object according to the plurality of images or the depth map, and the controller further determining relative coordinates of the plurality of feature points and determining external information corresponding to the object, and generating monitor information corresponding to the object according to offsets between the external information corresponding to the object and reference parameters corresponding to the object, wherein the relative coordinates of the plurality of feature points are not changed with distances between the at least one three-dimensional camera circuit and the plurality of feature points, the offsets are fixed, and the monitor information of the object is used for making the controller generate suggestions to reduce the offsets.

2. The monitor system of claim 1, wherein the each three-dimensional camera circuit comprises:
   a first image sensor capturing a first image of the plurality of images comprising the object;
   a second image sensor capturing a second image of the plurality of images comprising the object, wherein the first image corresponds to the second image; and
   a depth map generator coupled to the first image sensor and the second image sensor, wherein the depth map generator generates the depth map corresponding to the object according to the first image and the second image.

3. The monitor system of claim 2, wherein the each three-dimensional camera circuit further comprises:
   a filter coupled between the first image sensor, the second image sensor, and the depth map, wherein the filter converts the first image and the second image into monochrome images.

4. The monitor system of claim 2, wherein the each three-dimensional camera circuit further comprises:
   a synchronization circuit coupled between the first image sensor, the second image sensor, and the depth map generator, wherein the synchronization circuit outputs a first synchronization signal to the first image and a corresponding second synchronization signal to the second image.

5. The monitor system of claim 4, wherein the first synchronization signal corresponds to an image block of a plurality of image blocks comprised in the first image, and the corresponding second synchronization signal corresponds to a corresponding image block of a plurality of image blocks comprised in the second image.

6. The monitor system of claim 2, wherein the each three-dimensional camera circuit further comprises:
   a register storing an image block of the first image corresponding to each scan line of the first image sensor and a corresponding image block of the second image, wherein after the register completely stores image blocks of the first image corresponding to scan lines of the first image sensor and corresponding image blocks of the second image, the register outputs the first image and the second image.

7. The monitor system of claim 2, wherein the each three-dimensional camera circuit further comprises:
   a calibration circuit coupled to the first image sensor and the second image sensor, wherein before the first image sensor outputs the first image and the second image sensor outputs the second image, the calibration circuit executes calibration processing on the first image and the second image.

8. The monitor system of claim 7, wherein the calibration processing comprises a combination of a color space calibration and an assembly calibration.

9. The monitor system of claim 2, wherein the each three-dimensional camera circuit further comprises:
   a memory coupled to the first image sensor, the second image sensor, and the depth map generator, wherein the memory stores the first image, the second image, and the depth map.

10. The monitor system of claim 2, wherein the each three-dimensional camera circuit further comprises:
    a light source emitting a predetermined light pattern to the object, wherein when a corresponding distance exists between the first image sensor and the object, a ratio is determined according to a size of a predetermined light pattern formed on a surface of the object and a size of the predetermined light pattern emitted by the light source, wherein the light source has an emitting angle.

11. The monitor system of claim 1, wherein the each three-dimensional camera circuit transmits the depth map to the controller through a mobile-industry-processor-interface (MIPI) or a universal serial bus (USB).

12. The monitor system of claim 1, wherein the each three-dimensional camera circuit transmits the depth map to the controller through a wireless communication interface of a Wireless Fidelity (WiFi), a wireless LAN (WLAN), a Zigbee (IEEE 802.15.4), a Bluetooth, a Wireless Wide Area Network (WWAN), a General Packet Radio Service (GPRS), a third generation (3G), a fourth generation (4G), a fifth generation (5G), or an actor network theory+ (Ant+).

13. The monitor system of claim 1, further comprising:
    a storage circuit coupled to the controller, wherein the storage circuit stores the reference parameters corresponding to the object; and
    a display coupled to the controller, wherein the display displays the monitor information, wherein the controller determines the relative coordinates of the plurality of feature points according to the depth map, determines the external information corresponding to the object according to the relative coordinates of the plurality of feature points, and generates the monitor information corresponding to the object according to the offsets between the external information corresponding to the object and the reference parameters corresponding to the object.

14. The monitor system of claim 1, further comprising:
a support having at least one slot, wherein a three-dimensional camera circuit of the at least one three-dimensional camera circuit is installed on a corresponding slot of the at least one slot; and
a slide making the support be smoothly moved top-down or bottom-up.

15. The monitor system of claim 14, wherein each slot of the at least one slot is coupled to the support through a corresponding movement device and moved by the corresponding movement device, and the each slot is a Universal Serial Bus slot.

16. The monitor system of claim 1, wherein when the object is a person, the external information corresponding to the object comprises at least one of a chest circumference, a waistline, a hip, a shoulder width, a hand length, a leg length, a size of a head, a walking posture, and a curvature angle of a spine of the person.

17. The monitor system of claim 1, wherein when the object is a crop, the external information corresponding to the object comprises at least one of a size and an appearance of the crop.

18. An operation method of a monitor system, wherein the monitor system comprises at least one three-dimensional camera circuit, a controller, a storage circuit, and a display, and each three-dimensional camera circuit of the at least one three-dimensional camera circuit comprises a first image sensor, a second image sensor, and a depth map generator, the operation method comprising:
the each three-dimensional camera circuit capturing a plurality of images comprising an object, and generating a depth map corresponding to the object according to the plurality of images;
the controller determining a plurality of feature points corresponding to the object according to the plurality of images or the depth map;
the controller determining relative coordinates of the plurality of feature points and determining external information corresponding to the object; and
the controller generating monitor information corresponding to the object according to offsets between the external information corresponding to the object and reference parameters corresponding to the object, wherein the relative coordinates of the plurality of feature points are not changed with distances between the at least one three-dimensional camera circuit and the plurality of feature points, the offsets are fixed, and the monitor information of the object is used for making the controller generate suggestions to reduce the offsets.

19. The operation method of claim 18, wherein the controller determines the relative coordinates of the plurality of feature points according to the depth map and generates the external information corresponding to the object according to the relative coordinates of the plurality of feature points, and the controller generates the monitor information corresponding to the object according to the offsets between the external information corresponding to the object and the reference parameters corresponding to the object, wherein the reference parameters corresponding to the object are stored in the storage circuit, and the display displays the monitor information.

20. The operation method of claim 18, wherein when the object is a person, the external information corresponding to the object comprises at least one of a chest circumference, a waistline, a hip, a shoulder width, a hand length, a leg length, a size of a head, a walking posture, and a curvature angle of a spine of the person.

* * * * *